2,854,322
Patented Sept. 30, 1958

2,854,322
STABILIZATION OF ORGANIC MATERIALS

Verner L. Stromberg, Shrewsbury, Mo., assignor to Petrolite Corporation, Wilmington, Del., a corporation of Delaware No Drawing. Application December 30, 1954
Serial No. 478,934

22 Claims. (Cl. 44—63)

The present invention relates to the use of certain compounds as metal deactivators for inhibiting the catalytic oxidation of an organic substance caused by a metal such as copper.

More specifically, the compounds employed are obtained by reaction involving a cyclic amidine having a terminal primary amino radical and a hydroxylated aldehyde of the kind exemplified by glucose.

In its simplest aspect the invention may be illustrated by a compound of the following structure:

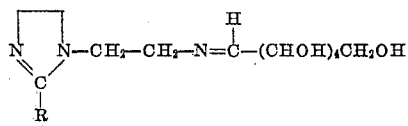

Or the hydrogenated derivative thereof, such as:

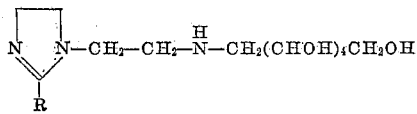

More specifically, the compounds derived, are obtained by reaction involving a cyclic amidine having a primary amino radical and an aldehyde of the kind exemplified by salicylaldehyde. One phase of the invention may be illustrated by a compound such as the following:

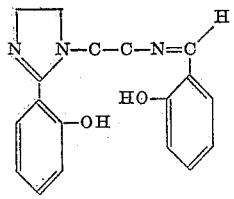

The above compound was derived from the imidazoline obtained from salicylic acid and diethylene triamine with subsequent reaction with salicylaldehyde.

The acid used for combination with the polyamine, such as diethylene triamine, may be a noncyclic acid such as stearic acid. The structure of a product so obtained is shown by the following formula:

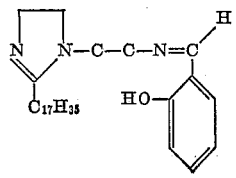

The products of the kind herein described may be subjected to hydrogenation and the hydrogenated derivatives are equally valuable for the herein described purpose. The hydrogenated derivatives of the two compounds described above correspond to the following structures:

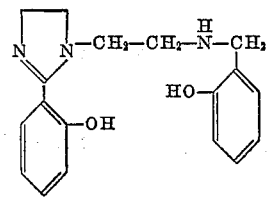

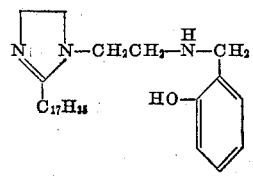

Reference to hydrogenation means the conversion of the Schiff's Base to the amine and may or may not include hydrogenation of the aromatic ring if present.

The above formulas show the compounds derived from a substituted imidazoline, i. e., a five-membered ring compound but it is to be noted that comparable compounds having a six-membered ring are included. Such compounds instead of being derivatives of substituted imidazolines are derivatives of substituted tetrahydropyrimidines. Both types of cyclic compounds, of course, belong to the broader class of cyclic amidines.

The compounds above depicted are deratives of diethylene triamine but one can use derivatives of higher alkylene amines such as triethylene tetramine, tetraethylene pentamine, etc. In such instances the secondary divalent amino radical, such as

would appear in the radical which links the heterocyclic ring with the hydroxylated aldehyde.

The type of compound herein depicted is not limited to monocarboxy acids, such as acetic acid and higher fatty acids, but includes dicarboxy acids such as diglycolic acid, dimeric fatty acids obtained by the dimerization of unsaturated higher fatty acids such as linseed oil fatty acid, etc.

More specifically then, the herein described amidines may be exemplified by the formula

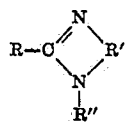

in which

has its previous significance, and R' is a member of the class consisting of

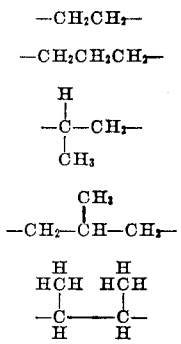

in which R'' is a radical selected from the class consisting of R'NH₂ or

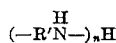

in which R has its prior significance and $n$ is a small whole number. The amino cyclic amidine above depicted is combined with a suitable aldehyde such as salicylaldehyde.

If, however, the cyclic amidine is derived from a dicarboxy acid, such as HOOC—R₁—COOH in which R₁ is the carboxyl-free dicarboxy acid residue, the dicyclic amidine obtained would correspond to

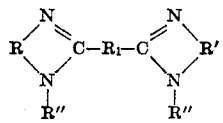

in which the various characters have their prior significance. The formation of the Schiff's Base is not limited to the use of an aldehyde but one may employ a ketone such as acetylacetone.

In recapitulation then, the present invention is concerned with certain Schiff's Bases and hydrogenated derivatives thereof. The Schiff's Bases are obtained by reaction between (A) a member of the class consisting of (a) substituted imidazolines and substituted tetrahydropyrimidines, characterized by the presence of a terminal primary amino group, and (b) substituted diimidazolines and substituted ditetrahydropyrimidines characterized by the presence of 2 terminal primary amino groups, and (B) at least one mole of a compound having a reactive carbonyl group such as an aldehyde exemplified by salicylaldehyde or a ketone exemplified by acetylacetone.

For convenience, what is said hereinafter will be divided into six parts:

Part 1 is concerned with suitable cyclic compounds containing a primary amino group in the terminal position. Part 1, for convenience, is divided into four divisions:

Division A is concerned with substituted imidazolines obtained from monocarboxy acids;

Division B is concerned with suitable substituted tetrahydropyrimidines obtained from monocarboxy acids;

Division C is concerned with substituted imidazolines obtained from dicarboxy acids;

Division D is concerned with substituted tetrahydropyrimidines obtained from dicarboxy acids;

Part 2 is concerned with suitable carbonyl compounds selected from the class of aldehydes and ketones and exemplified by salicylaldehyde, acetone, etc.

Part 3 is concerned with the reaction involving the first two classes enumerated above.

Part 4 is concerned with hydrogenated derivatives of the compounds described in Part 3, preceding.

Part 5 is concerned with the use of the herein described products for inhibiting the catalytic oxidation of an organic substance caused by a metal such as copper, and other similar metals or compounds. Stated another way, these compounds are valuable as metal deactivators particularly for use in combination with commercial antioxidants as employed in the petroleum industry. Such application is described in detail in Part 5.

Part 6 is concerned with the same application as in Part 5, preceding, except that the herein described compounds are employed in combination with other well known metal deactivators with the result that one obtains an unlooked for and synergistic effect at a lower cost than is otherwise possible.

PART 1

The manufacture of cyclic amidines and particularly substituted imidazolines and substituted tetrahydropyrimidines is well known. The production of such compounds has been described extensively in the patent literature and elsewhere. See Chemical Reviews, volume 54, No. 4, page 593. See also Imidazole and Its Derivatives, Part 1 (1953), Hoffmann, Interscience Publishers, New York.

Imidazolidines are obtained in various ways including the preparation from imidazolines. For convenience, they will be referred to as dihydroimidazolines. Likewise, hexahydropyrimidines are readily obtainable from tetrahydropyrimidines.

Division A

Substituted imidazolines are obtained from a variety of acids beginning with the one-carbon acid (formic) through and including higher fatty acids or the equivalent having as many as 30 carbon atoms. Modified fatty acids also can be employed as, for example, phenyl stearic acid or the like. Cyclic acids may be employed, including naphthenic acids. A variety of other acids including benzoic acid, substituted benzoic acid, salicyclic acid, and the like, have been employed to furnish the residue RC from the acid RCOOH in which the C of the residue RC is part of the ring. The fatty acids employed for example, may be saturated or unsaturated. They may be hydroxylated or nonhydroxylated. Branched long chain fatty acids may be employed. See J. Am. Chem. Soc., 74, 2523 (1952). This applies also to the lower molecular weight acids as well.

It will be noted that a variety of substituted imidazolines are included in Table 1 following. In some instances there is a radical having 8 or more uninterrupted carbon atoms and in other instances this is not the case.

Actually, substituted imidazolines can be obtained from a variety of polyamines but only in the instance where one starts with a triamine or higher amine is there a residual group having a primary amino radical as herein required. This does not mean, however, that one could not start with ethylene diamine or with 1,2-propylene diamine. The cyclic compounds so obtained could be reacted with a mole of ethylene imine or propylene imine so as to introduce the terminal primary amino group. From a practical standpoint, however, the most readily available polyamines are diethylene triamine, triethylene tetramine, and tetraethylene pentamine. No particular advantage has been found in using other polyamines in which some other divalent radical, such as

appears. For this reason examples in Table 1 are limited to derivatives of the three most readily available polyamines above indicated.

TABLE 1

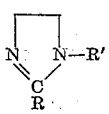

| Ex. No. | RCOOH source of RC | R' |
|---|---|---|
| 1a | Formic | $CH_2CH_2NH_2$ |
| 2a | Propionic | $CH_2CH_2NH_2$ |
| 3a | Isovaleric | $CH_2CH_2NH_2$ |
| 4a | Stearic | $CH_2CH_2NH_2$ |
| 5a | Melissic | $CH_2CH_2NH_2$ |
| 6a | Phenyl Stearic | $CH_2CH_2NH_2$ |
| 7a | Salicylic | $CH_2CH_2NH_2$ |
| 8a | Cresotinic | $CH_2CH_2NH_2$ |
| 9a | Naphthenic | $CH_2CH_2NH_2$ |
| 10a | Oleic | $CH_2CH_2NH_2$ |
| 11a | Acetic | $CH_2CH_2NHCH_2CH_2NH_2$ |
| 12a | Pelargonic | $CH_2CH_2NHCH_2CH_2NH_2$ |
| 13a | Lauric | $CH_2CH_2NHCH_2CH_2NH_2$ |
| 14a | Palmitic | $CH_2CH_2NHCH_2CH_2NH_2$ |
| 15a | Cerotic | $CH_2CH_2NHCH_2CH_2NH_2$ |
| 16a | p-Tert-butyl benzoic | $CH_2CH_2NHCH_2CH_2NH_2$ |
| 17a | p-Hydroxybenzoic | $CH_2CH_2NHCH_2CH_2NH_2$ |
| 18a | Salicylic | $CH_2CH_2NHCH_2CH_2NH_2$ |
| 19a | Hydroxy naphthenic | $CH_2CH_2NHCH_2CH_2NH_2$ |
| 20a | Benzoic | $CH_2CH_2NHCH_2CH_2NH_2$ |
| 21a | Formic | $CH_2CH_2NHC_2H_2CH_2NHCH_2CH_2NH_2$ |
| 22a | Methyloctadecanoic | $CH_2CH_2NHC_2H_2CH_2NHCH_2CH_2NH_2$ |
| 23a | Capric | $CH_2CH_2NHC_2H_2CH_2NHCH_2CH_2NH_2$ |
| 24a | Stearic | $CH_2CH_2NHC_2H_2CH_2NHCH_2CH_2NH_2$ |
| 25a | Phenylstearic | $CH_2CH_2NHC_2H_2CH_2NHCH_2CH_2NH_2$ |
| 26a | Cresotinic | $CH_2CH_2NHC_2H_2CH_2NHCH_2CH_2NH_2$ |
| 27a | Linoleic | $CH_2CH_2NHC_2H_2CH_2NHCH_2CH_2NH_2$ |
| 28a | Salicylic | $CH_2CH_2NHC_2H_2CH_2NHCH_2CH_2NH_2$ |
| 29a | 2-hydroxy-3-methoxybenzoic | $CH_2CH_2NHC_2H_2CH_2NHCH_2CH_2NH_2$ |
| 30a | Naphthenic | $CH_2CH_2NHC_2H_2CH_2NHCH_2CH_2NH_2$ |

Division B

The only polyamine available on a large scale for the manufacture of tetrahydropyrimidines is 3,3'-iminobispropylamine. This product can be converted into the tetramine or pentamine by appropriate reaction with a suitable imine, or by reaction with acrylonitrile followed by the usual steps of converting the intermediate into the amine. Tetrahydropyrimidines comparable to the substituted amidines in Table 1, appear in Table 2 immediately following.

TABLE 2

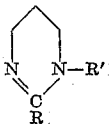

| Ex. No. | RCOOH source of RC | R' |
|---|---|---|
| 1b | Formic | $CH_2CH_2CH_2NH_2$ |
| 2b | Acetic | $CH_2CH_2CH_2NH_2$ |
| 3b | Butyric | $CH_2CH_2CH_2NH_2$ |
| 4b | Valeric | $CH_2CH_2CH_2NH_2$ |
| 5b | Isovaleric | $CH_2CH_2CH_2NH_2$ |
| 6b | Trimethyl acetic | $CH_2CH_2CH_2NH_2$ |
| 7b | Pelargonic | $CH_2CH_2CH_2NH_2$ |
| 8b | Lauric | $CH_2CH_2CH_2NH_2$ |
| 9b | Stearic | $CH_2CH_2CH_2NH_2$ |
| 10b | Arachidic | $CH_2CH_2CH_2NH_2$ |
| 11b | Eucosane-carboxylic | $CH_2CH_2CH_2NH_2$ |
| 12b | Cerotic | $CH_2CH_2CH_2NH_2$ |
| 13b | Melissic | $CH_2CH_2CH_2NH_2$ |
| 14b | Phenylstearic | $CH_2CH_2CH_2NH_2$ |
| 15b | Benzoic | $CH_2CH_2CH_2NH_2$ |
| 16b | Salicylic | $CH_2CH_2CH_2NH_2$ |
| 17b | Cresotinic | $CH_2CH_2CH_2NH_2$ |
| 18b | P-hydroxybenzoic | $CH_2CH_2CH_2NH_2$ |
| 19b | P-tert-butylbenzoic | $CH_2CH_2CH_2NH_2$ |
| 20b | 2-hydroxy-3-methoxy benzoic | $CH_2CH_2CH_2NH_2$ |
| 21b | Oleic | $CH_2CH_2CH_2NH_2$ |
| 22b | Undecylenic | $CH_2CH_2CH_2NH_2$ |
| 23b | Linoleic | $CH_2CH_2CH_2NH_2$ |
| 24b | Hydroxybutyric | $CH_2CH_2CH_2NH_2$ |
| 25b | Methyloctadecanoic | $CH_2CH_2CH_2NH_2$ |

Division C

The procedure employed in the manufacture of substituted imidazolines from dicarboxy acids is comparable to that employed when monocarboxy acids are used as reactants. As in the case of the monocarboxy acids, the acid may introduce a radical having less than 8 uninterrupted carbon atoms or 8 or more uninterrupted carbon atoms. Suitable products derived from the three amines previously noted are described in Table 3, following.

TABLE 3

| Ex. No. | HOOC—R—COOH source of —CRC— | R' |
|---|---|---|
| 1c | Malonic | $CH_2CH_2NH$ |
| 2c | Adipic | $CH_2CH_2NH$ |
| 3c | Suberic | $CH_2CH_2NH$ |
| 4c | Sebacic | $CH_2CH_2NH$ |
| 5c | Nonodecane dicarboxylic | $CH_2CH_2NH$ |
| 6c | Diglycolic | $CH_2CH_2NH$ |
| 7c | Ethylene bix(glycolic) | $CH_2CH_2NH$ |
| 8c | Methylene disalicylic | $CH_2CH_2NH$ |
| 9c | Stearyl Malonic | $CH_2CH_2NH$ |
| 10c | Phthalic | $CH_2CH_2NH$ |
| 11c | Succinic | $CH_2CH_2NHCH_2CH_2NH$ |
| 12c | Glutaric | $CH_2CH_2NHCH_2CH_2NH$ |
| 13c | Pimelic | $CH_2CH_2NHCH_2CH_2NH$ |
| 14c | Azelaic | $CH_2CH_2NHCH_2CH_2NH$ |
| 15c | Eicosane dicarboxylic | $CH_2CH_2NHCH_2CH_2NH$ |
| 16c | Dilinoleic | $CH_2CH_2NHCH_2CH_2NH$ |
| 17c | Isophthalic | $CH_2CH_2NHCH_2CH_2NH$ |
| 18c | Diglycolic | $CH_2CH_2NHCH_2CH_2NH$ |
| 19c | Lauryl Malonic | $CH_2CH_2NHCH_2CH_2NH$ |
| 20c | Methylene disalicylic | $CH_2CH_2NHCH_2CH_2NH$ |
| 21c | Malonic | $CH_2CH_2NHC_2H_2CH_2NHCH_2CH_2NH_2$ |
| 22c | Succinic | $CH_2CH_2NHC_2H_2CH_2NHCH_2CH_2NH_2$ |
| 23c | Suberic | $CH_2CH_2NHC_2H_2CH_2NHCH_2CH_2NH_2$ |
| 24c | Pimelic | $CH_2CH_2NHC_2H_2CH_2NHCH_2CH_2NH_2$ |
| 25c | Nonodecane dicarboxylic | $CH_2CH_2NHC_2H_2CH_2NHCH_2CH_2NH_2$ |
| 26c | Diglycolic | $CH_2CH_2NHC_2H_2CH_2NHCH_2CH_2NH_2$ |
| 27c | Methylene disalicylic | $CH_2CH_2NHC_2H_2CH_2NHCH_2CH_2NH_2$ |
| 28c | Stearyl malonic | $CH_2CH_2NHC_2H_2CH_2NHCH_2CH_2NH_2$ |
| 29c | Stearyl succinic | $CH_2CH_2NHC_2H_2CH_2NHCH_2CH_2NH_2$ |
| 30c | Terephthalic | $CH_2CH_2NHC_2H_2CH_2NHCH_2CH_2NH_2$ |

Other polycarboxy acids having 3 or 4 carboxy radicals, such as aconitic acid, tetracarboxybutane, tricarballylic acid, etc., may be employed.

Division D

In the use of dicarboxy acids the bulk of the examples were obtained from 3,3'-iminobispropylamine. These compounds are comparable to those which appeared in Table 3, preceding.

TABLE 4

| Ex. No. | HOOC—R—COOH source of —CRC— | R' |
|---|---|---|
| 1d | Malonic | $CH_2CH_2CH_2NH_2$ |
| 2d | Succinic | $CH_2CH_2CH_2NH_2$ |
| 3d | Glutaric | $CH_2CH_2CH_2NH_2$ |
| 4d | Adipic | $CH_2CH_2CH_2NH_2$ |
| 5d | Suberic | $CH_2CH_2CH_2NH_2$ |
| 6d | Sebacic | $CH_2CH_2CH_2NH_2$ |
| 7d | Pimelic | $CH_2CH_2CH_2NH_2$ |
| 8d | Azelaic | $CH_2CH_2CH_2NH_2$ |
| 9d | Nonodecane dicarboxylic | $CH_2CH_2CH_2NH_2$ |
| 10d | Eicosane dicarboxylic | $CH_2CH_2CH_2NH_2$ |
| 11d | Diglycolic | $CH_2CH_2CH_2NH_2$ |
| 12d | Ethylene bisglycolic | $CH_2CH_2CH_2NH_2$ |
| 13d | Methylene disalicylic | $CH_2CH_2CH_2NH_2$ |
| 14d | Dilinoleic | $CH_2CH_2CH_2NH_2$ |
| 15d | Stearyl malonic | $CH_2CH_2CH_2NH_2$ |
| 16d | Lauryl succinic | $CH_2CH_2CH_2NH_2$ |
| 17d | Isotetradecyl succinic | $CH_2CH_2CH_2NH_2$ |
| 18d | Phthalic | $CH_2CH_2CH_2NH_2$ |
| 19d | Isophthalic | $CH_2CH_2CH_2NH_2$ |
| 20d | Terephthalic | $CH_2CH_2CH_2NH_2$ |
| 21d | Glutaconic | $CH_2CH_2CH_2NH_2$ |
| 22d | Maleic | $CH_2CH_2CH_2NH_2$ |

PART 2

Suitable hydroxy aldehydes and hydroxy ketones which are reactive toward basic primary amines, are well known. The preferred reactant is o-vanillin. However, the number of additional reactants which may be included are of six types:

*Type A.*—Hydroxy aldehydes of the type exemplified by salicylaldehyde. The aldehyde may contain as substituents, alkoxy, aryloxy, halogen, heterocyclic, amino, cyano, and nitro groups as well as hydroxyl, alkyl and aryl radicals.

*Type B.*—Hydroxy aromatic ketones of the type exemplified by o-hydroxy acetophenone. The ketone may contain substituents as enumerated for the Type A aldehydes.

*Type C.*—Aliphatic diketones in which the two carbonyl groups are in a 1–3 relationship, that is

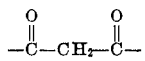

as exemplified by acetyl acetone. The diketone may contain as substituents, alkoxy, aryloxy, halogen, heterocyclic, alkyl and aryl radicals.

*Type D.*—Aliphatic ketones as exemplified by acetone. The ketone may contain as substituents, alkoxy, aryloxy, halogen, heterocyclic, alkyl and aryl radicals.

*Type E.*—Monooximes of alpha-beta diketones as exemplified by 2-3-butanedione 2-oxime. The monooximes may contain as substituents, alkoxy, aryloxy, halogen, heterocyclic, alkyl and aryl radicals.

*Type F.*—Poly-hydroxy aldehydes of the type exemplified by glucose.

PART 3

The two types of reactants previously described in Parts 1 and 2 are combined under conventional conditions to produce a Schiff's Base compound. Generally, the conditions require preferably a solvent in which both reactants are soluble, which allows the reaction to proceed at a lower temperature giving a lighter colored product. The reaction may be allowed to proceed in the absence of solvent, however, eliminating the necessity of solvent removal from the viscous reaction product. This necessitates longer reaction times or higher temperatures being employed.

The procedure employed in obtaining the Schiff's Base is illustrated by the following examples:

Example 1e

One mole of the imidazoline (Ex. 1a, Table 1) derived from formic acid was mixed with one mole of salicyclaldehyde at room temperature. The reaction mixture immediately became hot and some of the water produced in the reaction was noted escaping. Stirring was continued 30 minutes and the water formed removed in vacuo. A dark red product resulted.

Example 2e

One mole of the imidazoline derived from salicylic acid was mixed with one mole of o-vanillin and sufficient methanol added to ensure homogeneity. The solution was refluxed for 60 minutes. The solvent and the water formed in the reaction were then removed in vacuo from the brown-red viscous oil.

Example 3e

One mole of the diimidazoline derived from methylene disalicylic acid and 5 moles of acetone was refluxed for 60 minutes. The reaction mixture was concentrated and a light yellow solid resulted.

For sake of brevity a number of other examples are included in Table 5 following. It will be noted in these Examples 1e to 20e there are included a variety of compounds some of which include a high molal radical, and some of which do not. In some instances the compounds contain a single heterocyclic ring and in some instances 2 heterocyclic rings. In some instances the rings are five membered and in other instances six membered. Some examples are characterized by the presence of a free uncombined terminal primary amino radical.

TABLE 5

| Ex. No. | Cyclic cmpd. used | Moles | Carbonyl component used | Moles | Molar ratio | Solvent | Temp., °C. | Minutes |
|---|---|---|---|---|---|---|---|---|
| 1e | 1a | 1 | Salicylaldehyde | 1 | 1:1 | None | 20 | 30 |
| 2e | 18a | 1 | o-Vanillin | 2 | 1:1 | Methanol | 65 | 60 |
| 3e | 8c | 1 | Acetone | 2 | 1:2 | Acetone | 55 | 60 |
| 4e | 4a | 1 | Salicylaldehyde | 1 | 1:1 | Methanol | 65 | 60 |
| 5e | 17b | 1 | Acetyl acetone | 1 | 1:1 | do | 65 | 60 |
| 6e | 10a | 1 | o-Vanillin | 1 | 1:1 | do | 65 | 60 |
| 7e | 11a | 1 | do | 1 | 1:1 | do | 65 | 60 |
| 8e | 29a | 1 | do | 1 | 1:1 | do | 65 | 60 |
| 9e | 2b | 1 | do | 1 | 1:1 | do | 65 | 60 |
| 10e | 17b | 1 | 2,3-butanedione-2-oxime | 1 | 1:1 | Isopropanol | 83 | 60 |
| 11e | 24b | 1 | Salicylic | 1 | 1:1 | Methanol | 65 | 60 |
| 12e | 1c | 1 | o-Vanillin | 2 | 1:2 | do | 65 | 60 |
| 13e | 6c | 1 | do | 2 | 1:2 | do | 65 | 60 |
| 14e | 18c | 1 | do | 2 | 1:2 | Xylene | 140 | 60 |
| 15e | 27c | 1 | do | 2 | 1:2 | Isopropanol | 83 | 120 |
| 16e | 4d | 1 | Salicylaldehyde | 2 | 1:2 | do | 83 | 90 |
| 17e | 14d | 1 | do | 1 | 1:1 | do | 83 | 120 |
| 18e | 20d | 1 | do | 2 | 1:2 | do | 83 | 120 |
| 19e | 8d | 1 | do | 2 | 1:2 | do | 83 | 120 |
| 20e | 19b | 1 | o-Vanillin | 1 | 1:1 | do | 83 | 90 |

The derivatives having a single heterocyclic ring may be characterized by a formula which appears at the top of Table 6, following. The tabular data refers to ether compounds previously noted or referred to, or else other compounds which have been made to illustrate the present invention.

TABLE 6

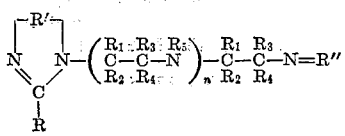

$n = 0, 1, 2, 3$

| R | R¹ | R² | R³ | R⁴ | R⁵ | n | R″ |
|---|---|---|---|---|---|---|---|
| H | H | H | H | H | | 0 | -Hydroxybenzylidene. |
| H | H | H | H | H | | 0 | 2-hydroxy-3-methoxy benzylidene. |
| CH³ | H | H | H | H | | 0 | o-Hydroxybenzylidene. |
| CH³ | H | H | H | H | | 0 | 2-hydroxy-3-methoxy benzylidene. |
| o-Hydroxyphenyl | H | H | H | H | | 0 | o-Hydroxybenzylidene. |
| Do | H | H | H | H | | 0 | 2-hydroxy-3-methoxy benzylidene. |
| H | H | H | H | H | | 0 | 4-keto-2-pentylidene. |
| H | H | H | H | H | H | 1 | o-Hydroxybenzylidene. |
| H | H | H | H | H | H | 1 | 2-hydroxy-3-methoxy benzylidene. |
| o-Hydroxyphenyl | H | H | H | H | H | 1 | o-Hydroxybenzylidene. |
| Do | H | H | H | H | H | 1 | 2-hydroxy-3-methoxy benzylidene. |
| 2-hydroxy-3-methyl phenyl | H | H | H | H | | 0 | 2-hydroxybenzylidene. |
| Do | H | H | H | H | H | 1 | o-Hydroxybenzylidene. |
| 2-hydroxy-3-methoxy phenyl | H | H | H | H | | 0 | Do. |
| Do | H | H | H | H | H | 1 | Do. |
| 2-hydroxy phenyl | H | H | H | H | | 0 | furfurylidene. |
| Do | H | H | H | H | | 0 | H². |

As has been pointed out previously, the herein described compounds need not be derivatives of monocarboxy acids but may be derivatives of dicarboxy acids or, for that matter, tricarboxy acids, and thus include compounds having 2 or more heterocyclic rings.

Reference is made to Table 7 immediately following, in which reference is made to the polycyclic compounds which illustrate the present invention. For numerous reasons I prefer to employ derivatives derived from monocarboxy acids, or if polycarboxy acids are used, to use the dicarboxy acids. The tabular data give some examples illustrating the structural formula which appears at the head of Table 7.

TABLE 7

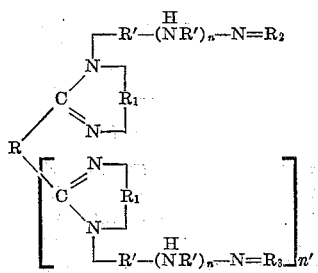

R = carboxyl free residue of a polycarboxy acid

R₁ and R′ = —CH₂—CH₂—, —CH₂—CH₂—CH₂—

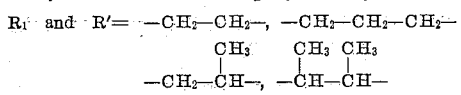

R₂ = carbonyl free residue of a carbonyl compound reactive toward primary amines
R₃ = H₂ or R₂
n = whole number including zero
n′ = whole number not greater than two and including zero.

PART 4

A variety of primary amines have been combined with glucose or the like to produce a compound comparable to the one herein described, in that it is a Schiff's Base. Such compounds have been described in various patents such as:

U. S. Patent No. 1,985,424, dated December 25, 1934, to Piggott.
U. S. Patent No. 2,016,962, dated October 8, 1935, to Flint et al.
U. S. Patent No. 2,016,963, dated October 8, 1935, to Flint et al.
U. S. Patent No. 2,193,433, dated March 12, 1940, to Salzberg.

Using the same hydrogenation procedure in regard to the compounds described in Part 3, preceding, one can readily convert the Schiff's Base into suitable amines which have certain advantages in instances over the Schiff's Base, in that they have greater stability. It should be pointed out that when such reactants as described in Part 1, preceding, are subjected to hydrogenation if derived from an unsaturated fatty acid or unsaturated dicarboxy acid, the conversion to the corresponding saturated compound takes place. Thus, the hydrogenated derivatives referred to in the appended claims include not only those in which the Schiff's Base has been converted into the corresponding amine but also those in which any unsaturated groups derived from mono- or dicarboxy acids have been converted into the corresponding saturated compound.

As a specific example illustrating the hydrogenation of the Schiff's Base obtained as previously described in Part 3, reference is made to the following three examples and Table 8, following. It will be noted the procedure employed is substantially the one described in United States patents preceding.

Example 1f 100 grams of the Schiff's Base (Ex. 1e, Table 5) derived from formic acid, diethylene triamine, and salicylaldehyde dissolved in 500 grams of anhydrous ethyl alcohol, and 10 grams of reduced nickel catalyst (20% nickel on carbon), was agitated under 2000 pounds hydrogen pressure at a temperature of 70° for 50 minutes. The catalyst was removed by filtration and the mother liquor concentrated giving the reduced Schiff's Base as a viscous non-crystalline syrup.

Example 2f 100 grams of the Schiff's Base (Ex. 12e, Table 5) derived from o-vanillin, diethylene triamine, and malonic acid dissolved in anhydrous ethyl alcohol, and 10 grams of reduced nickel catalyst (20% on carbon), was agitated under 2000 pounds' hydrogen pressure at a temperature of 100° for 60 minutes. The catalyst was removed by filtration and the mother liquor concentrated, giving the product as a viscous non-crystalline syrup.

Example 3f 100 grams of the Schiff's Base (Ex. 20e, Table 5) derived from o-vanillin, p-tert-butylbenzoic acid, and 3,3'-iminobispropylamine dissolved in anhydrous ethyl alcohol and 10 grams of Raney nickel catalyst, was

| R | R¹ | R′ | R₂ | R₃ | n | n′ |
|---|---|---|---|---|---|---|
| Malonic residue | —CH₂CH₂— | —CH₂CH₂— | Salicyl-aldehyde residue | Salicyl-aldehyde residue | 0 | 1 |
| Adipic residue | —CH₂CH₂CH₂— | —CH₂CH₂CH₂— | do | do | 0 | 1 |
| Azelaic residue | —CH₂CH₂CH₂— | —CH₂CH₂CH₂— | o-Hydroxy acetophenone residue | H₂ | 1 | 1 |
| Dilinoleic residue | —CH₂CH₂— | —CH₂CH₂— | o-Vanillin residue | o-Vanillin residue | 1 | 1 |
| Stearyl succinic residue | —CH₂CH₂— | —CH₂CH₂— | Acetyl acetone | Acetyl acetone | 2 | 1 |
| Methylene disalicylic residue | —CH₂CH₂— | —CH₂CH₂— | 2,3-butanedione-2-oxime residue | 2,3-butanedione-2-oxime residue | 2 | 1 |
| Diglycolic residue | —CH₂CH₂— | —CH₂CH₂— | Salicyl-aldehyde residue | Salicyl-aldehyde residue | 1 | 1 |
| Terephthalic residue | —CH₂CH₂— | —CH₂CH₂— | o-Vanillin residue | o-Vanillin residue | 2 | 1 |
| Aconitic residue | —CH₂CH₂— | —CH₂CH₂— | Acetone residue | Acetone residue | 0 | 2 |
| Tricarballylic residue | —CH₂CH₂— | —CH₂CH₂— | do | do | 0 | 2 | violently agitated under 75 pounds pressure at a temperature of 50° for 30 minutes. The catalyst was removed and the mother liquor concentrated, giving a semi-solid viscous oil.

TABLE 8

| Ex. No. | Cmpd. hydrogenated | Grams | Catalyst | Temp., °C. | Pres., lbs. sq. in. | Time, minutes |
|---|---|---|---|---|---|---|
| 1f | 1e | 100 | Supported nickel | 70 | 2,000 | 50 |
| 2f | 12e | 100 | do | 100 | 2,000 | 120 |
| 3f | 20e | 100 | Raney nickel | 50 | 75 | 30 |
| 4f | 2e | 100 | Supported nickel | 100 | 2,000 | 60 |
| 5f | 4e | 100 | do | 100 | 2,000 | 60 |
| 6f | 5e | 100 | do | 70 | 2,000 | 60 |
| 7f | 11e | 100 | do | 100 | 2,000 | 90 |
| 8f | 13e | 100 | do | 100 | 2,000 | 120 |
| 9f | 15e | 100 | do | 100 | 2,000 | 150 |
| 10f | 18e | 100 | do | 100 | 2,000 | 150 |

The products described in Parts 3 and 4 may vary widely in regard to surface-active properties and particularly as far as solubility in water, or similar polar solvents go on the one hand, and hydrocarbons, oils, or non-polar solvents on the other hand. A number of the products described and, in fact, all of them either before or after hydrogenation, have present one or more basic nitrogen atoms per molecule. Thus, they may be employed in the various forms in which comparable nitrogenous compounds are used, i. e., in the form of the anhydrous base, or in the form of the hydrated base (combination with water) or in the form of a salt. The salt may be a combination with an organic acid or an inorganic acid such as hydrochloric acid, phosphoric acid, nitric acid, sulfuric acid, etc. The acid employed, may be a carboxy acid or sulfonic acid. Furthermore, the acid may have more than one carboxyl group as in the case diglycolic acid, tetracarboxybutane, etc.

When a salt is formed from a low molal organic acid, particularly a hydroxylated organic acid such as acetic acid, butyric acid, lactic acid, hydroxyacetic acid, gluconic acid, etc., the tendency is to increase the hydrophile properties. However, when a salt is derived from an organic acid having 8 or more carbon atoms, such as a higher fatty acid, naphthenic acid, abietic acid, or the like, the tendency is to decrease the hydrophile properties and increase the hydrophobe properties.

Any reference to the use of these acylation derivatives, as for example in the claims, specifically includes all the various forms including the salt form and the hydrated base form referred to above, as well as the anhydrous base.

Attention is directed to the fact that the herein described compounds, either alone or in combination with other well known stabilizers, may be used for various purposes for which such compounds are used in connection with organic materials. In other words, the compounds may be employed for stabilization of any kind of organic compound which tends to deteriorate in storage or in use due to oxidation reactions. Various organic compounds, including motor fuel and particularly cracked gasoline and polymer gasoline, mineral oil, lubricating oil, fuel oil, drying oil, greases, rubber, edible fats and oils, etc., are adversely effected by oxygen, with the resultant formation of undesirable gum, discoloration, rancidity, or other deleterious reactions.

However, the more important use of these compounds is in the field of hydrocarbon fuels for uses as stabilized compositions and particularly metal deactivators. In such applications, surface active properties are of comparatively little importance but solubility in a hydrocarbon is very important. Thus, the preference is to select such compounds as herein described, particularly in Parts 5 and 6, which are oil-soluble within the proportions employed or at least oil-soluble when converted into a salt, such as the salt obtained from oleic acid, stearic acid, naphthenic acid, dimeric acid, etc. For this reason, as pointed out previously, reference to compositions in which the herein described products represent a part of a hydrocarbon fuel or the like, such terminology includes the salt form as well as the free base.

PART 5

As has been pointed out previously, Part 5 is concerned with the use of the herein described products for inhibiting catalytic oxidation of an organic substance caused by a metal such as copper and other similar compounds. These compounds are valuable as metal deactivators in the petroleum industry, particularly in use with gasoline, motor fuel, kerosene and the like.

As is well known, the amount of copper deactivator added is comparatively small, with the range of .0001% to 0.5%. The use of such materials is well known and has been described in a large number of patents. The method of testing such metal deactivators is conventional and has been described in A. S. T. M. D-525.

Tests were conducted in the manner described in the above reference and the results appear in the following table.

TABLE 9.—THE EFFECT OF COPPER DEACTIVATORS

The deactivators were tested in gasoline containing 0.002% butylaminophenol as an antioxidant and 1 p. p. m. Cu, added as copper oleate.

| No. | Deactivator | Conc., weight percent | Induction, minutes |
|---|---|---|---|
| 1x | None | | 70 |
| 2x | 1-aminoethylimidazoline-o-vanillin product | 0.001 | 390 |
| 3x | do | 0.002 | 450 |
| 4x | 1-aminoethylimidazoline salicylaldehyde product | 0.001 | 360 |
| 5x | 1-aminoethyl-2-methyl imidazoline salicylaldehyde product | 0.001 | 315 |
| 6x | 1-aminoethyl-2-(2-hydroxyphenyl) imidazoline salicylaldehyde product | 0.001 | 370 |
| 7x | 1-aminoethyl-2-(2-hydroxyphenyl) imidazoline o-vanillin product | 0.001 | 390 |
| 8x | do | 0.002 | 450 |
| 9x | N-aminoethyl-1-aminoethylimidazoline o-vanillin product | 0.001 | 465 |
| 10x | N-aminoethyl-1-aminoethylimidazoline salicylaldehyde product | 0.001 | 445 |
| 11x | 1-aminoethylimidazoline-acetyl acetone product | 0.001 | 200 |
| 12x | Bis [3-(1-aminoethyl-2-imidazolyl)-4-hydroxyphenyl]-methylene-acetone product | 0.001 | 345 |

PART 6

As has been pointed out previously, Part 6 is concerned with the same application as in Part 5, preceding, except that the herein described compounds are employed in combination with other well known metal deactivators, with the result that one obtains an unlooked for and synergistic effect, thus resulting in a lower cost than is otherwise possible. The synergistic effect on certain combinations appearing in Table 9 are shown in Table 10 immediately following. The test procedure, of course, is the same as in connection with data presented in Table 9. As to the synergistic effect in connection with well known copper deactivators, such as disalicylal propylene diimine, and disalicylal ethylene diimine, reference is made to Table 11, following. Here again the method of testing was the same as in connection with Tables 9 and 10.

TABLE 10.—SYNERGISTIC EFFECT OF COPPER DEACTIVATORS

| No. | Deactivator | Ratio | Total conc., weight percent | Induction, minutes |
|---|---|---|---|---|
| 1y | 2x–12x | 1:1 | 0.001 | 495 |
| 2y | 2x–6x | 1:1 | 0.001 | 495 |
| 3y | 2x–7x | 1:1 | 0.001 | 480 |
| 4y | 2x–9x | 1:1 | 0.001 | 490 |
| 5y | 6x–9x | 1:1 | 0.001 | 450 |

TABLE 11.—EFFECT OF COPPER DEACTIVATORS ON COMMERCIAL DEACTIVATORS

| No. | Deactivator | Ratio | Total conc., weight percent | Induction, minutes |
|---|---|---|---|---|
| 1z | Disalicylal propylene di-imine | | 0.001 | 595 |
| 2z | Disalicylal propylene di-imine plus 2x | 3:1 | 0.001 | 670 |
| 3z | ....do | 1:1 | 0.001 | 635 |
| 4z | Disalicylal ethylene di-imine | | 0.001 | 615 |
| 5z | Disalicylal ethylene di-imine plus 9x | 3:1 | 0.001 | 640 |
| 6z | ....do | 1:1 | 0.001 | 580 |

Having thus described my invention, what I claim as new and desire to obtain by Letters Patent, is:

1. A distilled hydrocarbon fuel composition containing unsaturated hydrocarbons which tend to form gums and a metal constituent which normally catalyzes oxidative deterioration and a small amount effective to deactivate the catalytic effect of the metal constituent of an inhibitor including a cyclic amidine selected from the class consisting of (A)
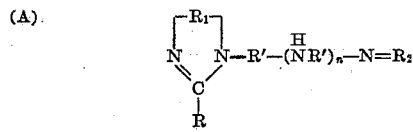

in which R is the carboxyl free residue of a monocarboxy acid; $R_1$ and $R'$ are a member of the class consisting of $$-CH_2-CH_2-$$
$$-CH_2-CH_2-CH_2-$$
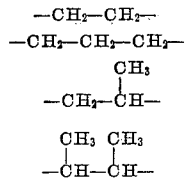

$R_2$ is the carbonyl free residue of a carbonyl compound reactive toward primary amines and n is a numeral not over 3 and including zero;

(B)
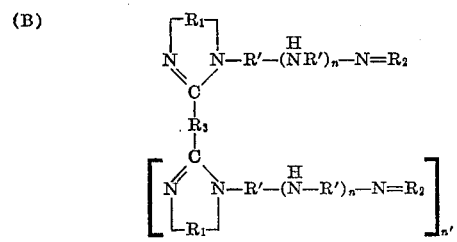

in which the various characters have their previous significance; $R_3$ is the carboxyl free radical of a polycarboxy acid having not over 4 carboxyl radicals; $n'$ is a whole number not greater than 3; (C) the hydrogenation derivatives of member (A) preceding; and (D) the hydrogenation derivatives of member (B) preceding.

2. The composition defined in claim 1, with the proviso that in the cyclic amidine, $n'$ is one.

3. Distilled hydrocarbon fuel containing unsaturated hydrocarbons which tend to form gums and a metal compound which normally catalyzes oxidative deterioration and additionally (a) a member of the class consisting of disalicylal propylene di-imine and disalicylal ethylene di-imine, and (b) a small amount effective to deactivate the catalytic effect of the metal compound of a cyclic amidine derivative as defined in claim 1.

4. Distilled hydrocarbon fuel containing unsaturated hydrocarbons which tend to form gums and a metal compound which normally catalyzes oxidative deterioration and additionally (a) a member of the class consisting of disalicylal propylene di-imine and disalicylal ethylene di-imine, and (b) a small amount effective to deactivate the catalytic effect of the metal compound of a cyclic amidine derivative as defined in claim 2.

5. A distilled hydrocarbon fuel composition containing unsaturated hydrocarbons which tend to form gums and a metal constituent which normally catalyzes oxidative deterioration and a small amount effective to deactivate the catalytic effect of the metal constituent of an inhibitor including a cyclic amidine selected from the class consisting of:

(A)
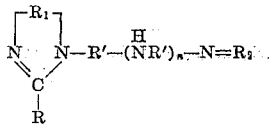

in which R is the carboxyl free residue of a monocarboxy acid; $R_1$ and $R'$ are a member of the class consisting of $$-CH_2-CH_2-$$
$$-CH_2-CH_2-CH_2-$$
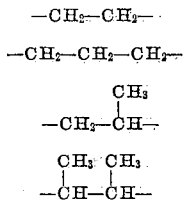

$R_2$ is the carbonyl free residue of a carbonyl compound reactive toward primary amines and n is a numeral not over 3 and including zero; and (B) hydrogenation derivatives thereof.

6. The composition defined in claim 5, with the proviso that in the cyclic amidine the heterocyclic ring be a five-membered ring.

7. The composition defined in claim 5, with the proviso that in the cyclic amidine the radical uniting any 2 nitrogen atoms contains a 2-carbon atom chain only.

8. The composition defined in claim 5, with the proviso that in the cyclic amidine the radical uniting any 2 nitrogen atoms contains 2 carbon atoms only.

9. The composition defined in claim 5, with the proviso that in the cyclic amidine the radical uniting any 2 nitrogen atoms contains 2 carbon atoms only, and with the proviso that the radical $R''$ is derived from a hydroxylated aldehyde.

10. The composition defined in claim 5, with the proviso that in the cyclic amidine the radical uniting any 2 nitrogen atoms contains 2 carbon atoms only and with the proviso that the radical $R''$ is derived from a mono-hydroxylated aldehyde.

11. The composition defined in claim 5, with the proviso that in the cyclic amidine the radical uniting any 2 nitrogen atoms contains 2 carbon atoms only and with the proviso that the radical $R''$ is derived from o-vanillin.

12. The composition defined in claim 5, with the proviso that in the cyclic amidine the radical uniting any 2 nitrogen atoms contains 2 carbon atoms only and with the proviso that the radical $R''$ is derived from o-vanillin and R is the residue of a higher fatty acid having at least 8 carbon atoms.

13. Distilled hydrocarbon fuel containing unsaturated hydrocarbons which tend to form gums and a metal compound which normally catalyzes oxidative deterioration and additionally (a) a member of the class consisting of disalicylal propylene di-imine and disalicylal ethylene di-imine, and (b) a small amount effective to deactivate the catalytic effect of the metal compound of a cyclic amidine derivative as defined in claim 5.

14. Distilled hydrocarbon fuel containing unsaturated hydrocarbons which tend to form gums and a metal compound which normally catalyzes oxidative deterioration and additionally (a) a member of the class consisting of disalicylal propylene di-imine and disalicylal ethylene di-imine, and (b) a small amount effective to deactivate the 15. Distilled hydrocarbon fuel containing unsaturated hydrocarbons which tend to form gums and a metal compound which normally catalyzes oxidative deterioration and additionally (a) a member of the class consisting of disalicylal propylene di-imine and disalicylal ethylene di-imine, and (b) a small amount effective to deactivate the catalytic effect of the metal compound of a cyclic amidine derivative as defined in claim 7.

16. Distilled hydrocarbon fuel containing unsaturated hydrocarbons which tend to form gums and a metal compound which normally catalyzes oxidative deterioration and additionally (a) a member of the class consisting of disalicylal propylene di-imine, and disalicylal ethylene di-imine, and (b) a small amount effective to deactivate the catalytic effect of the metal compound of a cyclic amidine derivative as defined in claim 8.

17. Distilled hydrocarbon fuel containing unsaturated hydrocarbons which tend to form gums and a metal compound which normally catalyzes oxidative deterioration and additionally (a) a member of the class consisting of disalicylal propylene di-imine and disalicylal ethylene di-imine, and (b) a small amount effective to deactivate the catalytic effect of the metal compound of a cyclic amidine derivative as defined in claim 9.

18. Distilled hydrocarbon fuel containing unsaturated hydrocarbons which tend to form gums and a metal compound which normally catalyzes oxidative deterioration and additionally (a) a member of the class consisting of disalicylal propylene di-imine and disalicylal ethylene di-imine, and (b) a small amount effective to deactivate the catalytic effect of the metal compound of a cyclic amidine derivative as defined in claim 10.

19. Distilled hydrocarbon fuel containing unsaturated hydrocarbons which tend to form gums and a metal compound which normally catalyzes oxidative deterioration and additionally (a) a member of the class consisting of disalicylal propylene di-imine and disalicylal ethylene di-imine, and (b) a small amount effective to deactivate the catalytic effect of the metal compound of a cyclic amidine derivative as defined in claim 11.

20. Distilled hydrocarbon fuel containing unsaturated hydrocarbons which tend to form gums and a metal compound which normally catalyzes oxidative deterioration and additionally (a) a member of the class consisting of disalicylal propylene di-imine and disalicylal ethylene di-imine, and (b) a small amount effective to deactivate the catalytic effect of the metal compound of a cylic amidine derivative as defined in claim 12.

21. The composition of claim 12 in which the distilled hydrocarbon fuel is gasoline.

22. The composition of claim 20 in which the distilled hydrocarbon fuel is gasoline.

References Cited in the file of this patent

UNITED STATES PATENTS

| | | |
|---|---|---|
| 2,381,592 | Gubelmann | Aug. 14, 1945 |
| 2,530,650 | Chenicek | Nov. 21, 1950 |
| 2,573,779 | Walters | Nov. 6, 1951 |
| 2,622,018 | White et al. | Dec. 16, 1952 |
| 2,641,539 | Thompson et al. | June 9, 1953 |
| 2,647,125 | Gunderson | July 28, 1953 |
| 2,668,100 | Luvisi | Feb. 2, 1954 |
| 2,713,583 | Smith | July 19, 1955 |
| 2,754,216 | Chenicek | July 10, 1956 |